3,388,149
OXIDATION OF 2,5-DIARYLAMINO-3,6-
DIHYDROTEREPHTHALIC ESTERS
Chi Kang Dien, Buffalo, N.Y., assignor to Allied Chemical Corporation, New York, N.Y., a corporation of New York
No Drawing. Filed Jan. 30, 1964, Ser. No. 341,426
13 Claims. (Cl. 260—471)

This invention relates to a new and improved process for the oxidation of 2,5-diarylamino-3,6-dihydroterephthalic esters.

2,5-diarylamino-3,6-dihydroterephthalic esters, which are known compounds, have the following formula:

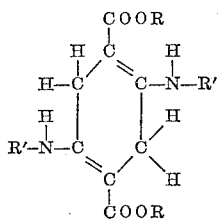

In the foregoing formula R stands for any group or radical capable of forming the above ester linkage, preferably lower alkyl groups, such as ethyl and methyl. Examples of other such groups encompass:

Aliphatic radicals: Propyl, t-butyl, hexyl, n-octyl, lauryl, stearyl.

Cycloaliphatic radicals: Cyclohexyl, methylcyclohexyl, methylcyclopentyl, 4-cyclohexylcyclohexyl.

Aromatic radicals: Phenyl, o,m,p-tolyl, 2-chlorophenyl, naphthyl, mesityl, cresyl, duryl.

Heterocyclic radicals: Pyridyl, quinolyl, thiazinyl.

In the foregoing formula the arylamino groups, represented by NHR' can be single or fused ring aromatic radicals with any number of substitutions on the ring structure. The aromatic amine plays no role in the reactions taking place in the process of the invention.

The following aromatic amino groups are exemplary illustrations of the diverse types of groups that can be substituted onto the terephthalate nucleus:

o,m,p-toluidino
o,m,p-fluoroanilino
o,m,p-chloroanilino
o,m,p-bromoanilino
o,m,p-iodoanilino
o,m,p-anisidino
o,m,p-phenetidino
o,m,p-isoamoxyanilino
o,m,p-trifluoromethylanilino
α or β-naphthylamino
2 or 4-biphenylamino-, etc.

It is known to convert 2,5-diarylaminodihydroterephthalic esters to valuable quinacridone pigments by oxidizing the dihydro-ester to the corresponding 2,5-diarylaminoterephthalic ester, hydrolyzing the terephthalic ester to the corresponding acid, ring closing the acid, and conditioning the resulting quinacridone derivative to a desirable pigment form. Generally the hydrolyzing step is carried out as a saponification by refluxing the ester with a strongly alkaline substance e.g. caustic soda or caustic potash in aqueous solution of a polar organic solvent, such as a lower aliphatic alcohol or N-methyl pyrrolidone. The saponified mixture is diluted with sufficient water to give an aqueous solution containing less than about 25%, generally about 10–15% by weight of the organic solvent and acidified to precipitate diarylaminoterephthalic acid which is recovered in a conventional manner, such as by filtration. Frequently the oxidation and hydrolysis steps are carried out concurrently in accordance with the following overall equation:

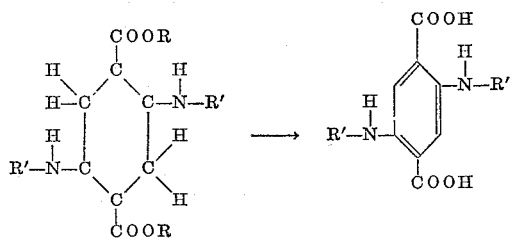

The reagents employed by prior art processes for the oxidation of 2,5-diarylamino-3,6-dihydroterephthalic esters are not entirely satisfactory. These oxidizing agents produce reduction products which, together with the generally used excess, and consequently unreacted reagent, are difficult to separate from the hydrolized reaction mass. For example, nitrobenzene, which can be used as an oxidizer in the oxidation of 2,5-diarylamino-3,6-dihydroterephthalates, produces an oily, water-insoluble reduction product which is removed from the reaction product with great difficulty. Alternatively, it is known to oxidize the 2,5-diarylamino-3,6-dihydroterephthalates with a water soluble oxidizing agent, m-nitrobenzene sulfonic acid, but in this instance the excess oxidizer stays in solution and cannot be recovered by simple mechanical means such as filtration, and the unreacted m-nitrobenzene sulfonic acid and its water soluble reduction products contaminate the diarylaminoterephthalic acid end product and can only be removed by careful, tedious washing.

It is the principal object of the present invention to device a new and improved process for oxidizing 2,5-diarylamino-3,6-dihydroterephthalic esters.

It is another object of the present invention to provide a novel, economical method for preparing 2,5-diarylaminoterephthalic acid and its salts.

These and additional objects and advantages will be apparent from the following description of my invention.

The invention is carried out by heating 2,5-diarylamino-3,6-dihydroterephthalic esters in the presence of an oxidizing agent comprising essentially a water-insoluble aromatic nitro-compound having a melting point at least about 25° C. and being devoid of water-solubilizing groups.

In a preferred embodiment of the invention polynitro compounds of the aforementioned type are used, since all nitro groups thereof are capable of contributing to the oxidation reaction and thereby permit improved efficiency and economy of the reaction.

It has been discovered, according to the invention, that the reduction products of water-insoluble aromatic nitro compounds are also insoluble in water, as well as in dilute aqueous solutions of polar organic solvents at ambient and lower temperatures. After the oxidation with the nitro compound and saponification with the caustic alkali, the unreacted amounts of the nitro compound, as well as the solid reduction products of the nitro compound can be removed from the reaction mixture by simple mechanical means, such as filtration.

According to a collateral discovery of the invention, it was found that the water-insoluble reduction products of water-insoluble aromatic nitro compounds which have a melting point at least about 25° C., have similarly, melting points above about 25° C. As a result of the foregoing, at about 25° C., or below, unreacted amounts of the water-insoluble aromatic nitro compounds, as well as the water-insoluble reduction products of the reacted nitro compounds are present in solid form, thereby permitting easy separation thereof from the reaction mixture.

Nitro compounds of the aforementioned type, which can be used in accordance with the invention, include both mono- and polynitro compounds. In the case of a mononitro compound at least ⅔ mols of mononitro compound should be used for each mol of the dihydroester. When the oxidation is carried out simultaneously with the hydrolyzing step, according to the preferred embodiment of the invention, preferably 0.9 to 1.1 mols of the mononitro compound are present for each mol of the dihydroester. When the oxidation is carried out in a separate step and prior to the hydrolysis, preferably 2 to 30 mols of mononitro oxidant is employed per mol of the ester. In this case the use of more than 40 mols of the mononitro oxidant per mol of the ester is unnecessary. When using dinitro or higher nitro compounds, the above figures have to be divided by the number of nitro groups in a molecule of the particular polynitro compound. Typical nitro compounds useful in carrying out the invention, include:

Mononitro compounds
p-nitrotoluene
o,m,p-nitrobromobenzene
3,4-dimethoxynitrobenzene
5-nitro-m-xylene
nitro-mesitylene
α-nitronaphthalene
β-nitronaphthalene
p-nitrodiphenyl
o,m,p-nitrochlorobenzene
o,m,p-nitroiodobenzene
2,5-dichloronitrobenzene
3,4-dichloronitrobenzene
p-nitroanisole
p-nitrophenetole
2-chloro-4-nitrotoluene
2-nitroanthraquinone

Polynitro compounds
2,4-dinitrochlorobenzene
2,4-dinitrobromobenzene
2,4-dinitroiodobenzene
2,4-dinitroanisole
2,4-dinitrophenetole
2,4-dinitrotoluene
1,3-dinitronaphthalene
1,5-dinitronaphthalene
1,8-dinitronaphthalene
4,4'-dinitrodiphenyl
o,m,p-dinitrobenzene
3,5-dinitroethylbenzene
1,2,3-trinitrobenzene
1,5-dinitroanthraquinone Mixtures of two or more of said mono and/or polynitro-aromatic compounds can also be used.

Trinitro- and higher polynitro aromatic compounds are generally very unstable and can usually be safely used only with great care, and in the presence of a diluent, such as in the preferred mode of carrying out the invention, wherein the oxidation and hydrolysis steps are carried out concurrently.

In accordance with a preferred mode of operation of my invention, oxidation of a 2,5-diarylamino-3,6-dihydroterephthalic ester is accomplished in a simultaneous step with a conventional hydrolysis of the ester. Thus a mixture of dihydro-ester and at least about ⅓ mol, preferably about 0.45 to 0.55 mol of a dinitro-compound per mol of the ester is heated in an aqueous polar organic solvent, such as 95% aqueous ethyl alcohol to at least about 60° C., preferably about 75–80° C. Caustic alkali is charged to the mass and heating is continued at about 80° C. until the reaction mixture is substantially homogeneous, generally in about 30 to 60 minutes. The mixture is diluted with ice or water and filtered at a preferred temperature of 0–20° C. to remove the insoluble mixture of reduction products of the nitro-compound as well as any unreacted oxidizing agent. The filtrate is acidified and the precipitated acid is collected by filtration or other suitable means, such as centrifugation. The product is washed free of acid and inorganic ions with water. Alternatively, in known manner, the filtrate can be saturated with sodium chloride and the precipitated salt of 2,5-diarylaminoterephthalic acid isolated. The salt can be readily converted on acidification to the corresponding acid in known manner.

According to another variation of this invention, the dihydro ester is oxidized and the oxidation product containing a high yield of 2,5-diarylaminoterephthalic ester is hydrolyzed in a subsequent step. According to this procedure the dihydro-ester in admixture with the defined oxidizing agent, preferably about 1 to 15 mols of a dinitrocompound per mol of the ester, is heated at a temperature of at least about 150° C. preferably about 190–205° C. for about 3 to 4 hours. Preferably the reaction is conducted under an atmosphere of inert gas, such as nitrogen. The reaction mass is commingled with aqueous organic solvent and caustic and saponified as previously described.

The diarylaminoterephthalic acid obtained according to my novel process is of excellent yield and quality and is eminently suitable for conversion to a quinacridone pigment by known methods.

As solvent for hydrolyzing the ester, advantageously, a lower aliphatic alcohol, such as methyl-, ethyl-, propyl alcohol is employed. Conveniently, an aqueous solution, containing about 85–95% alcohol is used. Especially good results can be obtained by using ethyl alcohol which is readily available in a 95% by weight aqueous solution.

The amount of alcohol or other polar solvent used in the hydrolysis of the ester is not critical; generally about 2 to 5 parts by weight of solvent, based on the weight of 2,5-diarylaminodihydroterephthalic ester, are used.

The amount of caustic alkali should be sufficient to supply a metal ion to each of the two carboxy groups in the ester portion of the starting material, i.e., there should be at least about 2 mols of caustic per mol of starting ester. An excellent result is obtained by employing about 3.0 to 3.5 weight equivalents of caustic per mol of the ester.

When oxidation of the dihydro-ester is effected concurrently with hydrolysis, a reaction temperature of at least about 60° C. is employed. If ethyl alcohol is employed as organic solvent, the reaction temperature employed is the boiling point of the refluxing mixture, which is about 80° C. under atmospheric pressure. Higher temperatures of reaction achieved through use of superatmospheric pressure can be employed but are unnecessary.

When oxidation of the dihydro-ester is accomplished in a separate step, prior to the hydrolysis, a higher temperature, at least about 150° C. and preferably about 190–205° C., is required for a practical reaction rate. Heating the reaction mass to temperatures substantially in excess of about 220° C. may result in uncontrollable reaction and hence is to be avoided.

After hydrolysis the reaction mass is diluted in known manner with sufficient ice or water to give an aqueous solution containing less than about 25% by weight of organic solvent, desirably about 10 to 15% by weight of organic solvent. Conveniently about 10 to 12 parts by weight of water or ice per part by weight organic solvent present are employed. A lower aliphatic alcohol which is employed as the organic solvent can, if desired, be substantially removed from the reaction mass by passing steam through the reaction mixture prior to the dilution. In this instance, conveniently about 5 parts of water per part by weight of the dihydro-ester are added in the dilution step.

After dilution the reaction mixture is conveniently allowed to stand for a short period, generally about 5 to 20 minutes at a temperature of about between 0° C. and about 25° C. to allow the recovery of any excess nitrocompound together with the insoluble reduction products thereof in a solid form. The insoluble reaction products and the excess nitro-compound are then removed by conventional means, such as by filtration from the reaction mixture at a temperature between about 0° C. and about 25° C.

The more detailed practice of this invention and the best mode contemplated in carrying it out are illustrated by the following examples.

These examples are not to be interpreted as limiting the invention to all details of the examples. Parts and percentages are by weight and temperatures are given in degrees centigrade.

Example 1

A mixture of 20 parts (0.0528 mols) of the dimethyl ester of 2,5-dianilino-3,6-dihydroterephthalic acid, 4 parts (0.0238 mols) of m-dinitrobenzene, 79 parts of 95% aqueous ethyl alcohol (U.S. grade 2B) was heated to about 75° under reflux. After addition of 12 parts of 50% aqueous sodium hydroxide over a period of about 15 minutes, the mixture was refluxed at 80° for 25 minutes. The reaction mass was diluted by addition of 100 parts of water and steam distilled to remove ethyl alcohol. An aqueous distillate (150 parts by volume) containing substantially all of the ethyl alcohol present, was thus collected. The distilland was charged to 200 parts of ice and allowed to stand for 25 minutes. The mixture was then filtered to remove unreacted dinitro-compound and its reduction products. The filtrate was charged to a mixture of 29 parts of aqueous hydrochloric acid (20° Bé.) and 250 parts of water, and filtered. The filter cake was washed free of acid and chloride ions with water. The 2,5-dianilinoterephthalic acid obtained, when dried in air at about 80°, weighed 17.2 parts corresponding to a 94% yield.

Example 2

A mixture of 101.5 parts (0.25 mol) of diethyl-2,5-dianilino-3,6-dihydroterephthalate, 20.4 parts (0.1213 mol) of m-dinitrobenzene, 238 parts of 95% aqueous ethyl alcohol (U.S. grade 2B), and 30 parts of water was heated to reflux. To the refluxing mixture, 60 parts of aqueous 50% sodium hydroxide were charged over a period of 30 minutes. On completion of the addition, the mixture was refluxed for one hour and charged to 2000 parts of water at 0–5°. The drowned mass was agitated for five minutes and allowed to stand at a temperature below 20° without agitation for 30 minutes. 20 parts Filter-Cel, which is a filter aid comprising diatomaceous earth, was charged and the mixture was agitated for five minutes and filtered to remove unreacted m-dinitro compound and its reduction products. The filtrate was added over a 15 minute period to a mixture of 116 parts of aqueous hydrochloric acid (20° Bé.) and 500 parts of water. The precipitate 2,5-dianilinoterephthalic acid, was isolated by filtration, washed free of acid and chloride ion with water at 50–60° and dried. An excellent yield of this product was obtained.

Example 3

The process of Example 1 was repeated substantially as described except that 5 parts (0.0275 mol) of 2,4-dinitrotoluene were employed as the oxidizing agent. An excellent yield of 2,5-dianilinoterephthalic acid was obtained.

Example 4

The process of Example 1 was repeated substantially as described except that 5 parts (0.0247 mol) of 2,4-dinitrochlorobenzene was employed as the oxidizing agent. An excellent yield of 2,5-dianilinoterephthalic acid was obtained.

Example 5

By a procedure similar to that of Example 2, 130 parts (0.299 mol) diethyl - 2,5 - bis(p-toluidino) dihydroterephthalate were converted to 2,5-bis(p-toluidino) terephthalic acid using 32 parts (0.234 mol) p-nitrotoluene as oxidizing agent. 109 parts, which is a 97% yield, of the acid was recovered.

Example 6

By a procedure similar to that of Example 2, 25 parts (0.0576 mol) diethyl - 2,5 - bis(p-toluidino) dihydroterephthalate were converted to 2,5-bis(p-toluidino) terephthalic acid, employing 8 parts (0.0508 mol) p-nitrochlorobenzene as oxidant. 21 parts, which is a 97% yield of the acid was obtained.

I claim:

1. A process for the oxidation of 2,5-diarylamino-3,6-dihydroterephthalic ester, to 2,5-diarylamino-3,6-terephthalic esters which comprises contacting the ester with an aromatic, water insoluble nitro compound having a melting point of at least 25° C. wherein said nitro compound is present in an amount to provide at least ⅔ molar equivalent of nitro group per mol of ester.

2. The process of claim 1, wherein said contacting is substantially carried out at a temperature at least about 60° C.

3. The process of claim 2, further comprising the step of further contacting the ester with caustic alkali to saponify the ester substantially simultaneously with the oxidation thereof to 2,5-diarylamino-3,6-terephthalic acids.

4. The process of claim 2, wherein the ester is a member of the group consisting of dimethyl-2,5-dianilino-3,6-dihydroterephthalate, diethyl-2,5-dianilino-3,6-dihydroterephthalate, and diethyl-2,5-bis(p-toluidino)3,6-dihydroterephthalate; and said nitro compound is a member of the group consisting of m-dinitrobenzene, 2,4-dinitrotoluene, 2,4-dinitrochlorobenzene, p-nitrotoluene, and p-nitrochlorobenzene.

5. The process of claim 4, wherein the ester is dimethyl-2,5-dianilino-3,6-dihydroterephthalate, and the nitro compound is m-dinitrobenzene.

6. The process of claim 4, wherein the ester is diethyl-2,5-dianilino-3,6-dihydroterephthalate, and the nitro compound is m-dinitrobenzene.

7. The process of claim 4, wherein the ester is dimethyl-2,5-dianilino-3,6-dihydroterephthalate, and the nitro compound is 2,4-dinitrotoluene.

8. The process of claim 4, wherein the ester is dimethyl-2,5-dianilino-3,6-dihydroterephthalate, and the nitro compound is 2,4-dinitrochlorobenzene.

9. The process of claim 4, wherein the ester is diethyl-2,5-bis(p-toluidino)3,6-dihydroterephthalate, and the nitro compound is p-nitrotoluene.

10. The process of claim 4, wherein the ester is diethyl-2,5-bis(p-toluidino)3,6-dihydroterephthalate, and the nitro compound is p-nitrochlorobenzene.

11. The process of claim 2, wherein said aromatic nitro compound is a dinitro compound and 1 to 15 mols of the dinitro compound are contacted with each mol of the ester, and the temperature is at least 150° C. to prepare 2,5-diarylamino-3,6-terephthalic esters.

12. The process of claim 3, wherein the temperature is between 75 and 80° C.

13. The process of claim 12, wherein said aromatic nitro compound is a dinitro compound and 0.33 to 0.55 mols of the dinitro compound are contacted with each mol of the ester to prepare 2,5-diarylamino-3,6-terephthalic acids.

References Cited

UNITED STATES PATENTS 3,285,952  11/1966  Dien _____ 260—471

LORRAINE A. WEINBERGER, *Primary Examiner.*

A. THAXTON, *Assistant Examiner.*